United States Patent [19]

Mitsuishi et al.

[11] 4,115,617
[45] Sep. 19, 1978

[54] WEATHER-RESISTANT ADHESIVE FILM

[75] Inventors: Yukio Mitsuishi; Shigeru Shiozaki, both of Machida; Kinji Hasegawa, Sagamihara, all of Japan

[73] Assignee: Teijin Limited, Osaka, Japan

[21] Appl. No.: 669,972

[22] Filed: Mar. 24, 1976

[51] Int. Cl.$^2$ .................. B32B 15/08; B32B 27/36
[52] U.S. Cl. ........................... 428/336; 428/337; 428/339; 428/343; 428/344; 428/354; 428/458; 428/480; 528/273
[58] Field of Search ............... 428/337, 339, 343, 344, 428/480, 354, 458, 336; 260/75 T

[56] References Cited
U.S. PATENT DOCUMENTS

| | | | |
|---|---|---|---|
| 2,804,416 | 8/1957 | Phillipsen | 428/344 X |
| 2,823,421 | 2/1958 | Scarlett | 264/216 |
| 2,829,070 | 4/1958 | Osborn | 428/480 |
| 2,916,398 | 12/1959 | Marvin | 428/344 X |
| 2,928,132 | 3/1960 | Richards | 260/75 T X |
| 3,165,499 | 1/1965 | Alles | 260/75 T |
| 3,177,277 | 4/1965 | Adams et al. | 260/75 T X |
| 3,290,203 | 12/1966 | Antonson et al. | 428/458 X |
| 3,432,591 | 3/1969 | Heffelfinger | 260/75 T X |
| 3,627,579 | 12/1971 | Heffelfinger | 260/75 T X |
| 3,631,899 | 1/1972 | Erickson | 428/500 X |
| 3,718,495 | 2/1973 | Tomita | 428/480 X |
| 3,775,226 | 11/1973 | Windorf | 428/458 X |
| 3,776,805 | 12/1973 | Hansen | 428/458 X |
| 3,903,294 | 9/1975 | Abella | 264/289 |
| 3,949,134 | 4/1976 | Willdorf | 428/458 X |

Primary Examiner—Harris A. Pitlick
Attorney, Agent, or Firm—Wenderoth, Lind & Ponack

[57] ABSTRACT

An adhesive film having weatherability comprising (I) a polyethylene terephthalate film base being oriented in at least one direction and having a refractive index, in the orientation direction, of 1.57 to 1.78, a refractive index, in the thickness direction, of 1.48 1.57, a density of 1.340 to 1.390 g/cm$^3$, and a thickness of 5 to 250 microns, and (II) an adhesive layer coated on at least one surface of said film base (I) either directly or through (III) a layer of a thin metallic film or an adhesive film comprising (I), (II) coated on one surface of (I), and (III) coated on the other surface of (I).

8 Claims, 1 Drawing Figure

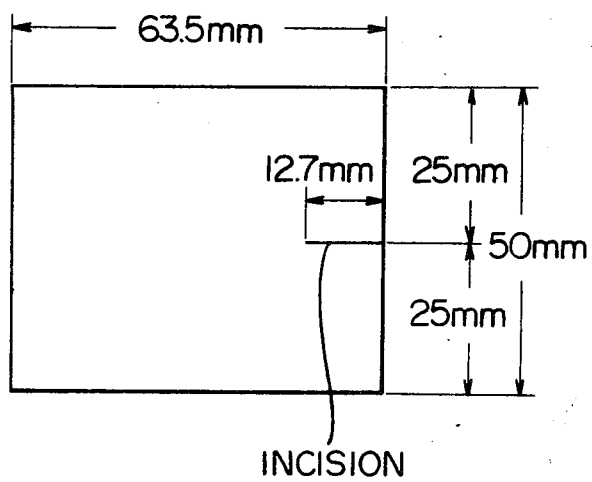
INCISION

WEATHER-RESISTANT ADHESIVE FILM

This invention relates to a weather-resistant adhesive film, and more specifically, to an adhesive film composed of a polyethylene terephthalate film as a base and having superior weatherability which is suitable for outdoor use.

Adhesive films find a wide range of household, commercial and industrial applications, for example, as a supporting or packaging material in the form of a large-width sheet or a narrow tape. Many of the adhesive tapes are composed of a base of Cellophane or a thermoplastic resin film such as a polypropylene, polyvinyl chloride or polyethylene terephthalate film as a base and an adhesive coated thereon.

Since the polyethylene terephthalate film has superior chemical, physical, mechanical and thermal properties, especially superior dimensioned stability, temperature stability, chemical resistance, abrasion resistance and water resistance, it is conveniently used as a base of adhesive film in fields which require the above-mentioned properties. This film, however, has the defect that when it is exposed to sunlight for long periods of time, its mechanical properties are markedly deteriorated by ultraviolet light. It has been known to incorporate an ultraviolet absorbent or coat it on the surface of film so as to improve the weather resistance of the film. However, these means are unable to impart weatherability sufficient for withstanding long sunlight exposure. In addition, the use of large quantities of the ultraviolet absorbent is not desirable in certain applications of adhesive tapes because it will impair the ultraviolet transmission and transparency of the film.

It is an object of this invention therefore to provide an adhesive film having superior weatherability, ultraviolet transmission and transparency which comprises a polyethylene terephthalate film base that exhibits superior weatherability without using a large quantity of an ultraviolet absorbent.

We have found that a polyethylene terephthalate film oriented in at least one direction and having (1) a refractive index, in the oriented direction, of 1.57 to 1.78, preferably 1.59 to 1.75, more preferably 1.61 to 1.72, (2) a refractive index, in the thickness direction, of 1.48 to 1.57, preferably 1.485 to 1.56, more preferably 1.49 to 1.55, (3) a density of 1.340 to 1.390 g/cm$^3$, preferably 1.350 to 1.382 g/cm$^3$, more preferably 1.355 to 1.379 g/cm$^3$, and (4) a thickness of 5 to 250 microns, preferably 10 to 150 microns, more preferably 15 to 50 microns is suitable for the object of this invention.

Thus, according to the present invention there is provided an adhesive film comprising (I) a base of a polyethylene terephthalate film having the aforesaid characteristics and (II) an adhesive layer coated on at least one surface of said film base.

In a preferred embodiment of the present invention, the polyethylene terephthalate film used as a base of the adhesive film (to be referred to hereinbelow as a base film or a film base) further has the property of shrinking (shrinkage) at least 4% in at least one direction thereof (therefore, in only one or in two directions, but preferably in two directions) when it is exposed in the relaxed state to hot air at 120° C for 1 minute. An adhesive film of this invention prepared by using the above film having a shrinkage of at least 4% as a base, when used for example as a wire insulating tape, gradually shrinks and becomes taut as it is exposed to sunlight. However, films having a shrinkage of less than 4% produce only a low degree of such an effect. Films having a shrinkage of at least 10% are especially preferred in the present invention.

The polyethylene terephthalate film used as a base in this invention can be prepared by any desired method. For example, it can be prepared by stretching an unstretched film of polyethylene terephthalate having an intrinsic viscosity, as measured in an o-chlorophenol solution at 35° C, of 0.4 to 1.0, preferably 0.6 to 0.95, and more preferably 0.7 to 0.9 and melt-extruded at an ordinary extruding temperature (260° to 330° C), in one direction to 2.5 to 5.0 times, preferably 3.0 to 4.5 times, the original dimension at a temperature which affords a refractive index ($n_{SD}$), in a direction at right angles to the stretching direction, of not more than 1.560 after the stretching, then, if required, stretching it in a direction at right angles to the first stretching direction (if the first stretching direction is a machine direction, then the second stretching direction is a transverse direction) to 2.5 to 5.0 times (stretch ratio), preferably 3.0 to 4.5 times at 50° to 80° C, and heat-setting the resulting monoaxially or biaxially oriented film at 80° to 150° C, preferably 80° to 130° C, for 1 to 100 seconds, preferably 2 to 50 seconds. Polyethylene terephthalate films prepared by the above method from unstretched film having an intrinsic viscosity of 0.6 to 0.95 are especially useful in the present invention because they are resistant to crystallization and therefore have a low haze value, and are superior in transparency and break or tear strength and elongation. Films prepared by the above method from polyethylene terephthalate having an intrinsic viscosity of less than 0.6 tend to show a high breakage frequency when stretched at relatively low temperatures.

When the stretching temperature at the first stretching is elevated, the refractive index ($n_{SD}$) of the film tends to increase. Accordingly, the upper limit of the first stretching temperature is a temperature which affords a refractive index of 1.560 after the monoaxial stretching. The lower limit of the stretching temperature is the lowest stretching temperature at which a markedly great non-uniformity in thickness ascribable to the mingling of the unstretched portion and the high stretched portion does not occur. The stretching temperature which affords a refractive index of 1.560 differs somewhat according to the type of the polymer or the stretch ratio, but usually, it is about 5° to 10° C higher than the above lower limit of the stretching temperature.

One advantage common to all embodiments of the invention is that the polyethylene terephthalate film used as a base has weatherability which is expressed by the fact that after having been exposed for 100 hours to a high pressure mercury lamp having 365 nm as the strongest spectrum, the film has a break elongation in at least one direction thereof of at least 10%, preferably at least 15%, more preferably at least 25%. This will be demonstrated by Examples to be given hereinbelow.

Although we are not limited by any theory, the superior weatherability of the polyethylene terephthalate film base used in this invention is due presumably to the fact the film has such a low density as 1.340 to 1.390 g/cm$^3$. Since the polyethylene terephthalate film base used in this invention has a low density, its crystal size and long period are both small. It has a crystal size in the direction of 010 plane of 15 to 45 A, preferably is to 40 A, a crystal size in the direction of 100 plane of 20 to 55 A, preferably 20 to 45 A, and a long period of 100 to 140 A, preferably 100 to 135 A. In such a low density polyethylene terephthalate film base in accordance with this invention, the number of tie-molecules connecting the crystals to one another is overwhelmingly larger than that in ordinary high density polyethylene terephthalate films having a large crystal size and a great long period. Let us assume that the cleavage of molecules occurs with the same probability with regard to the same length of molecule when both of these films are exposed to sunlight under the same conditions. Then, it follows that the number of tie-molecules remaining uncleaved is larger in the low density polyethylene terephthalate film used in the present invention than in the ordinary high density polyethylene terephthalate films. The larger number of remaining tie-molecules means that tension between molecules is maintained higher, and in other words, the weatherability of the film is better.

The polyethylene terephthalate used in this invention includes not only polyethylene terephthalate as a homopolymer, but also a copolyethylene terephthalate consisting of at least 85% of ethylene terephthalate recurring units and the remainder being another unit, and a polymer blend consisting of at least 85% by weight, preferably at least 90% by weight, of polyethylene terephthalate and not more than 15% by weight, preferably not more than 10% by weight, of another polymer. Examples of the other polymer that can be blended are polyamides, polyolefins, and other types of polyesters. If desired, the polyethylene terephthalate may contain lubricants, delusterants, coloring agents, stabilizers, antioxidants, antistatic agents, etc. The addition of a moderate amount of an ultraviolet absorbent brings about a favorable result to the present invention.

Base films in accordance with this invention prepared by the above method from polyethylene terephthalate containing a minor amount, for example, 0.05 to 10% by weight, preferably 0.1 to 5% by weight, of an ultraviolet absorber have especially superior weatherability when they meet the following equation $$A/d \geqq 25$$

wherein $A$ is the optical density of the base film measured by a spectrophotometer, and $d$ is the thickness of the base film expressed in centimeters, in a wavelength region of ultraviolet rays (not more than 325 nm).

The reason for this is not clear. Presumably, however, it is ascribed to the following. Films having an $A/d$ of lower than 25 ($cm^{-1}$) permit a good transmission of ultraviolet rays having a wavelength of not more than 325 nm, and ultraviolet rays are absorbed uniformly in the thickness direction of the film. Therefore, the film deteriorates throughout. In contrast, films having an $A/d$ of greater than 25 ($cm^{-1}$) absorb ultraviolet rays of the above wavelength region almost completely at their surface. Hence, the interior of the film is less deteriorated, and the film as a whole exhibits superior weatherability. There is no particular upper limit to the $A/d$ value, but since films having too high an $A/d$ value tend to reject visible rays and ultraviolet rays having a wavelength larger than 325 nm at the same time, the $A/d$ value of the film is preferably not more than 5,000 ($cm^{-1}$), especially 50 to 2,500 ($cm^{-1}$).

As described hereinabove, polyethylene terephthalate base films in accordance with this invention having an $A/d$ value of at least 25 ($cm^{-1}$) have a low transmittance of ultraviolet rays having a wavelength of not more than 325 nm. Ultraviolet rays having such short wavelengths tend to inhibit the growth of plants. But when the adhesive films in accordance with this invention are used for greenhouses, there can be obtained an effect of improving the growth of the plants in a low temperature period when their growth is slow.

Examples of the ultraviolet absorber used in this invention are benzophenone compounds such as 2,4-dihydroxybenzophenone, 2,2',4,4'-tetrahydroxybenzophenone, 2,2'-dihydroxy-4-methoxybenzophenone, 2-hydroxy-4-methoxy-2'-carboxybenzophenone 2-hydroxy-4-n-octoxybenzophenone, 2,-hydroxy-4-n-octoxy-4'-chlorobenzophenone, or 2-hydroxy-4-stearoxy-3',4'-dichlorobenzophenone; benzotriazole compounds such as 2-(2'-hydroxy-3'-tertiary butyl-5'-methylphenyl)-5-chlorobenzotriazole, 2-(2'-hydroxy-3',5'-ditertiary butylphenyl)-5-chlorobenzotriazole, 2-(2'-hyxroxy-3'-tertiary butyl-5'-methylphenyl) benzotriazole, 2-(2'-hydroxy-3',5'-ditertiary butylphenyl) benzotriazole 2-(2'-hydroxy-4-octoxy) benzotriazole, 2-(2'-hydroxy-3',5'-dineopentyl) benzotriazole, or 2-(2'-hydroxy-5'-methylphenyl) benzotriazole; salicylate compounds such as trimethylol propane trisalicylate, pentaerythritol tetrasalicylate, phenylethylene glycol disalicylate, or n-octyl-5-methyl salicylate. Of these, the benzophenone compounds are especially preferred.

The adhesive film of this invention can be produced by coating an adhesive on one or both surfaces of the polyethylene terephthalate base film described above.

Any known adhesives can be used in this invention, and for example, rubbery polymers, vinyl ether polymers, acrylic polymers, polyvinyl acetate, polyvinyl chloride, and an ethylene/vinyl acetate copolymer can be suitably used. Examples of the rubbery polymer are natural rubber, polyisobutylene, SBR (rubber composed of 1 mole of styrene and 4 to 5 moles of butadiene), ABR (rubber composed of 1 mole of acrylonitrile and 2 to 3 moles of butadiene), neoprene, polyisoprene (containing 70 to 80% of a trans-1,4 bond), a butyl rubber (containing 95 to 98% of isobutylene and 1.5 to 5% of isoprene), and a chlorinated rubber (a mixture of a trichloride and a tetrachloride). Examples of the vinyl ether polymer are polyvinyl butyral and polyvinyl isobutyl ether. Examples of the acrylic polymer include polyacrylates, and copolymers of acrylates and acrylonitrile.

When the adhesive film of this invention is to be used for controlling thermic rays, it is convenient to use a so-called water-activatable adhesive which becomes adhesive on addition of water. Examples of adhesives of this kind are polyvinyl alcohol, a partially saponified product of polyvinyl acetate, polyethylene oxide, polyacrylamide, polyacrylic acid, polyvinyl pyrrolidone, hydroxyethyl cellulose, methyl cellulose, and carboxymethyl cellulose.

Adhesives curable by irradiation of light, such as from a sunlight lamp, for example, a mixture composed of a polyester, an unsaturated monomer and an initiator, can also be used in the present invention.

The above adhesives, as required, may contain a tackifier (e.g., rosin, dammar, copal, hydrogenated rosin, rosin esters, coumarone-indene resins, Piccopale, polyterpene, nitrocellulose, alkyd resins, xylene resins, or epoxy resins), a plasticizer, an adhesiveness-regulating agent, an antioxidant, a stabilizer, a coloring agent, etc. Since the adhesive films of this invention are frequently used for outdoor applications, the adhesive preferably contains an ultraviolet absorbent. All of the ultraviolet absorbers exemplified hereinabove for incorporation in the base film can be used for this purpose.

The coating of the film base with the adhesive can be performed in accordance with conventional procedures. For example, the adhesive is applied to the film base in the form of its solution or emulsion in an organic solvent, and then dried. Or a hot-melt adhesive such as a copolymer of ethylene and vinyl acetate can be melt-extruded onto the film base. If desired, prior to the coating of the adhesive, the surface to be coated may be subjected to a surface activating treatment such as a corona discharge treatment, or coated with an anchor coating agent.

In order to coat the adhesive on the film base, a knife coater, roller coater, gravure coater, bead coater, dip coater, knife-over-roll coater, extrusion coater or the like is used in a customary manner.

The thickness of the adhesive layer coated on the film base is not particularly restricted. Preferably, however, it is 20 to 100 microns when the adhesive film is intended for outdoor use, and 2.5 to 10 microns when it is intended for thermic ray control.

In order to prevent the adhesion of foreign matter to the adhesive layer and render the handling of the adhesive film easy, the exposed surface of the adhesive layer may be mechanically protected, for example, by a removable release liner (e.g., a strippable sheet), or a coating of a water-soluble substance (e.g., a non-tacky coating of methyl cellulose). If further required, the same release liner or water-soluble coating as mentioned above, or a normally solid releasing agent having poor tackiness such as a polyolefin, cellulose, polyester, melamine resin, phenolic resin, alkyd resin, polyvinyl chloride, or silicone resin can be applied to that surface of the film base which is not coated with the adhesive layer.

Surprisingly, we found that in the adhesive film of this invention, adhesion between the adhesive layer (II) and the film base (I) is very firm. The reason for it is not clear, but it seems to have something to do with the low density of the polyethylene terephthalate film used. Accordingly, when the surface of the film base is rendered non-crystalline by, for example, corona discharge, the adhesion strength between the adhesive layer (II) and the film base (I) can be further increased. Since the adhesion between the adhesive layer (II) and the film base (I) is firm, adhesive coating conditions, such as the type of the adhesive and the post-treating conditions, can be selected from broad ranges in the present invention.

The base film (I) used in this invention may have a thin metallic film layer (III) on one surface thereof. In this case, the adhesive layer (II) is applied either to (1) the other surface of the film base (I), (2) the thin metallic film layer (III), or (3) both the other surface of the base film and the thin metallic film layer.

Generally, in the case of (1), the thin metallic layer (III) becomes exposed and is susceptible to injury or corrosion, and therefore, it is necessary to apply a protective coating to the surface of the metallic layer (III). In the case of (2), however, the adhesive layer (II) conveniently acts as a protective coating for the metallic layer (III).

The formation of the thin metallic layer on the surface of the polyethylene terephthalate film base is conveniently carried out by a vacuum deposition method or a vapor-phase plating method. Other methods can also be employed. Preferably, the thin metallic layer is provided so that it may produce a transparency reflecting effect. For this purpose, various metals such as gold, silver, bronze, nickel, or aluminum can be used. Aluminum is used widely in a film for controlling thermic rays (or sunlight). Sometimes, it is preferred to use gold or bronze which gives a warm color. The thickness of the thin metallic layer is 5 to 200 m$\mu$, preferably 10 to 100 m$\mu$, more preferably 10 to 60 m$\mu$.

The adhesive can be coated on the thin metallic layer in the same way as in the case of coating it on the surface of the film base described hereinabove.

Since the adhesive film of this invention has superior weatherability and is resistant to deterioration during use in places exposed to sunlight, it finds a wide range of utility as road markings or exterior decoration of houses, for example. The adhesive film of this invention having a thin metallic film layer is useful for controlling thermic rays, and when it is adhered to the inside or outside of a windowpane in a house by means of the adhesive layer, it properly shields sunlight and prevents glaring light caused by visible light rays. Furthermore, it permits proper lighting, prevents intense heat by infrared rays and the color fading or degeneration of furniture and household implements by ultraviolet rays.

The following Examples and Comparative Examples illustrate the present invention more specifically.

The properties of the film shown in the following examples were measured by the following methods.

(1) Elongation at Break

An adhesive film specimen having a length of 10 cm and a width of 1 cm was pulled at a rate of 100%/min. in an atmosphere held at room temperature and a relative humidity of 65% using Tensilon UTM-III-500 (a product of Toyo Baldwin Company). A load-elongation chart of the specimen was prepared, and the degree of elongation of the specimen at breakage based on the original length was measured and expressed in percent.

(2) Strength at Break

In the above test (1), the force required to break the adhesive film was expressed by the force exerted on the film per unit cross-sectional area (Kg/mm$^2$).

(3) Refractive Index

The refractive index of a base film with regard to a D line of Na was measured at 25° C using an Abbe's refractometer. Frequently, the refractive index varies in the widthwise direction of the film, but in the present application, the maximum value of the varying refractive indices was employed. The refractive index of the film in the machine direction (longitudinal direction) was designated as $n_x$; that in the trasverse direction (widthwise direction), as $n_y$; and that in the thickness direction, as $n_z$.

(4) Density

The density of a base film was measured by a floating method at 25° C in a mixture of n-heptane and carbon tetrachloride.

(5) Weatherability

Using a high pressure mercury lamp (a mercury lamp H400-P for photochemistry, electric source 100 V; a product of Tokyo Shibaura Electric Company), an adhesive film was placed at a position 20 cm away from a rod-like light source in parallel with it. The surface of the film was irradiated with light from the lamp for a predetermined period of time.

The mercury lamp used had the following operational characteristics.

| Total length: | 295 mm |
| --- | --- |
| Tube diameters: | 81.5 mm |
| Power of the lamp: | 400 W |
| Voltage of the lamp: | 130 V |
| Current of the lamp: | 3.3 A |
| Arc length: | 150 mm |
| Brightness: | 200 Cd/cm$^2$ |
| Strongest spectrum: | 365 nm |
| Radiation limit: | 220 nm |

(6) Weatherability (Examples 23 to 29 and Comparative Examples 11 and 12)

Using a sunshine weather-ometer (Standard Sunshine Weather-ometer WE-Sun-DC, a product of Toyo Rika Kogyo Kabushiki Kaisha), an adhesive film specimen was irradiated at its surface for a predetermined period of time at a black panal temperature of 35° C through a cycle consisting of 2 hour irradiation and 18-minute showering while it was rotated around a light source (Matsuda Sunshine Carbon) at a rate of 1 revolution per minute.

(7) Light Transmittance

It was measured after a base film specimen was irradiated for a predetermined period of time with light of wavelength 500 nm using the above spectrophotometer (8) Heat shrinkage Two indicator lines speced from each other by a distance of 30 cm were provided on a base film spectrum. The film was exposed for 1 minute to hot air at 120° C (80° C in Comparative Example 9), and cooled to room temperature. Then, the distance between the indicator lines was measured. The heat shrinkage was calculated as the ratio (%) of decrease in the distance between the indicator lines from that before heating (30 cm).

(9) Tear Strength

In accordance with the method described in JIS P-8116, an incision was provided, as shown in the accompaying drawing, in an adhesive film specimen having a size of 63.5 mm (the tearing direction) × 50 mm, and then torn off using a light load tear tester (a product of Toyo Seiki Seisakusho). The force (Kg) required to tear it off was measured, and converted to the force per unit thickness (mm) of the base film. This force was defined as tear strength (Kg/mm).

The accompanying FIGURE of the drawing shows the shape and size of an adhesive film specimen used for measurement of tear strength.

(10) Haze

Using an integrating sphere-type light transmittance measuring device, the amount of incident light ($T_1$), the total amount of light transmitted ($T_2$), the amount of light scattered by the device ($T_3$), and the amount of light scattered by the device and the test specimen ($T_4$) were measured with respect to a base film. The haze was calculated in accordance with the following equation.

$$\text{Degree of cloudiness (haze)} = \frac{Td}{Tt} \times 100 \, (\%)$$

$$\text{wherein } Tt = \frac{T_2}{T_1} \times 100, \text{ and}$$

$$Td = \frac{T_4 - T_3(T_2/T_1)}{T_1} \times 100$$

(11) Intrinsic Viscosity

Using o-chlorophenol as a solvent, the intrinsic viscosity of a base film was measured at 35° C. The unit was 100 cc/g.

(12) Frequency of Breakage

A base film specimen was stretched continuously for a long time, and the number of breakages which occurred per 500,000 meters of the film length was measured.

(13) Dustproofness

In order to express the amount of dust adhering to the surface of film, the light transmittance of a base film specimen which had been exposed outdoors for 4 years and the light transmittance of that film after washing with ethanol were both measured. By comparing the two transmittance values, the dustproofness of the film was evaluated.

(14) Optical Density Characteristics

The optical density of a base film specimen within a wavelength region of 220 to 650 nm (220 to 650 m$\mu$) was measured using a spectrophotometer (a multi-purpose autorecording spectrophotometer, MPS-5000, a product of Shimazu Seisakusho), and the ratio of the minimum value (A) of the optical density of the film in a wavelength region not greater than 325 nm to the thickness (d) of the film (the thickness in centimeters obtained by dividing the weight of the film by the product of the surface area of the film multiplied by its density), that is, A/d (cm$^{-1}$), was measured, and defined as optical density characteristics. Since the optical density curve drawn by a polyethylene terephthalate film within a short wavelength region not greater than 325 nm shows a minimum value at a wavelenggth of 325 nm, if the ratio A/d at a wavelength of 325 nm is at least 25 (cm$^{-1}$), this condition is met in the entire wavelength region below 325 nm.

(15) Adhesion Strength

To the adhesive layer of an adhesive film specimen A having a width of 1 inch and a length of 2 inches was bonded a film B of the same material and size as the base film of the adhesive film specimen. The upper end of the film A was fixed, and the upper end of the film B was held and pulled along the surface of the film A at a speed of 12 inches/min. The force required to strip off the film B from the film A was measured at a temperature of 25° C and a relative humidity of 65%, and expressed in g/inch.

(16) Peel Rate of Thin Metallic Film Layer

The adhesive layer of an adhesive film B composed of a 36 micron-thick polyethylene terephthalate film as a base and having an adhesion strength of 1200 g/inch was superimposed on the upper surface of the thin metallic film layer of an adhesive film specimen A, and both films were bonded to each other at a load of 5 Kg so as not to entrain air bubbles therebetween. The upper end of the film A was fixed, and the upper end of the film B was held and instantaneously pulled along the surface of the film A to strip off the film B from the film A. At this time, the percentage of that area of the thin metallic film layer in a zone (32 mm wide and 50 mm long) on the film A, which was stripped off and moved to the film B, was measured. An average of 10 replicates was calculated.

(17) Visible Ray Transmittance

The transmittance (%) of visible light rays (550 nm) was measured by the same spectrophotometer as used in (14) above using an assembly obtained by bonding an adhesive film specimen to the surface of a transparent glass sheet having a thickness of 6 mm.

(18) Ultraviolet Ray Transmittance

The transmittance (%) of ultraviolet ray (340 nm) was measured by the same spectrophotometer as used in (14) above using an assembly obtained by bonding an adhesive film specimen to the surface of a transparent glass sheet having a thickness of 6 mm.

EXAMPLES 1 to 5 and Comparative Examples 1 and 2

Ester-interchange and polycondensation of dimethyl terephthalate and ethylene glycol were performed using as a catalyst 40 millimole% of manganese acetate, 20 millimole% of antimony trioxide and 40 millimole% of phosphorous acid (the amounts being based on the dimethyl terephthalate) to afford polyethylene terephthalate having an intrinsic viscosity of 0.65.

The polyethylene terephthalate was dried at 170° C, melt-extruded at 280° C, and quenched and solidified on a casting drum held at 40° C to afford an unstretched film having a thickness of 350 microns (in Examples 1 to 4 and Comparative Examples 1 and 2) or 700 microns (in Example 5) and an intrinsic viscosity of 0.62.

In Examples 1 to 3 and 5, the unstretched film was stretched in the machine direction at a stretch ratio of 3.5 and a temperature of 65° C, and successively in the transverse direction at a stretch ratio of 4.0 and a temperature of 65° C, and then heat-seat for 10 seconds at each of the temperatures indicated in Table 1 to form a biaxially oriented polyethylene terephthalate film having a thickness of 125 microns.

On the other hand, in Comparative Examples 1 and 2, the unstretched film was stretched in the machine direction at a stretch ratio of 3.5 and a temperature of 90° C, and successively in the transverse direction at a stretch ratio of 4.0 and a temperature of 110° C, and heat-set for 10 seconds at 210° C to form a biaxially oriented film having a thickness of 125 microns.

In Example 4, an unstretched film was prepared under the same conditions as above from a mixture of the polyethylene terephthalate pellets dried at 170° C. and 0.3% by weight of 2-(2'-hydroxy-5'-methylphenyl)benzotriazole as an ultraviolet absorber (TINUVIN-320, trademark for a product of Ciba-Geigy, Switzerland), and then stretched and heat-set under the same conditions as in Examples 1 to 3 and 5.

In Comparative Example 2, the same unstretched film as prepared in Example 4 was stretched and heat-set under the same conditions as in Comparative Example 1.

Each of these oriented polyethylene terephthalate films was used as a base. Both surfaces of the base film were subjected to a corona discharge treatment, and one surface was coated with a silicon-type releasing agent, and the other surface with a polymer solution obtained by heating 100 parts by weight of benzene, 45 parts by weight of ethyl acrylate, 50 parts by weight of vinyl butylether, 5 parts by weight of acrylic acid and 0.493 part by weight of azodiisobutyronitrile in an atmosphere of nitrogen. Then the coatings were dried at 100° C for 10 minutes. Thus, adhesive films having a 10 micron-thick adhesive layer were obtained.

The properties of these adhesive films were measured and the results are shown in Table 1.

Table 1

| | | | Examples | | | | | Comparative Examples | |
|---|---|---|---|---|---|---|---|---|---|
| | | | 1 | 2 | 3 | 4 | 5 | 1 | 2 |
| | Heat-setting temperature (° C.) | | 150 | 140 | 125 | 125 | 125 | 210 | 210 |
| | Refractive index | $n_x$ | 1.645 | 1.642 | 1.638 | 1.639 | 1.640 | 1.661 | 1.660 |
| | | $n_y$ | 1.660 | 1.653 | 1.639 | 1.640 | 1.639 | 1.666 | 1.667 |
| | | $n_z$ | 1.491 | 1.500 | 1.507 | 1.508 | 1.503 | 1.497 | 1.497 |
| | Density (g/cm$^3$) | | 1.3814 | 1.3777 | 1.3716 | 1.3713 | 1.3714 | 1.3990 | 1.3988 |
| | Long period (Å) | | 140 | 125 | 120 | 120 | 120 | 165 | 158 |
| | Crystal size | (010) plane (Å) | 45 | 36 | 25 | 25 | 26 | 53 | 55 |
| | | (100) plane (Å) | 58 | 40 | 33 | 34 | 33 | 68 | 70 |
| | Adhesion strength (g/inch) | | 1050 | 1100 | 1200 | 1200 | 1100 | 700 | 700 |
| | Measuring direction | | MD* | MD | MD | MD | MD | MD | MD |
| | Before testing | Elongation at break (%) | 92 | 89 | 84 | 83 | 85 | 101 | 100 |
| | | Strength at break (kg/mm$^2$) | 26.2 | 25.3 | 24.2 | 24.3 | 24.5 | 24.8 | 24.6 |
| exposure | After exposure for 25 hours | Elongation at break (%) | 48 | 51 | 77 | 70 | 78 | 23 | 37 |
| Irradiation by a high pressure mercury lamp | | Strength at break (kg/mm$^2$) | 16.1 | 18.3 | 21.3 | 22.1 | 22.1 | 12.5 | 12.7 |
| | After exposure for 50 hours | Elongation at break (%) | 41 | 62 | 69 | 76 | 74 | 5 | 15 |
| | | Strength at break (kg/mm$^2$) | 13.8 | 16.4 | 19.5 | 24.1 | 21.1 | 9.3 | 10.7 |
| | After exposure for 100 hours | Elongation at break (%) | 30 | 43 | 63 | 80 | 71 | 6 | 13 |
| | | Strength at break (kg/mm$^2$) | 13.2 | 15.4 | 18.9 | 22.5 | 19.1 | 7.4 | 9.1 |
| Dust proofness | Before testing (%) | | 91.8 | 91.8 | 91.7 | 91.3 | 91.5 | 91.7 | 91.3 |
| | After outdoor exposure | Before washing (%) | 86.3 | 85.6 | 87.0 | 87.0 | 88.1 | 62.6 | 63.5 |
| | | After washing (%) | 90.4 | 90.6 | 90.5 | 90.6 | 90.1 | 80.7 | 82.1 |

*Machine direction

The results shown in Table 1 demonstrate that the adhesive films of this invention have superior dustproofness, and when irradiated by a high-pressure mercury lamp for 100 hours, retain more than 50% of their strength before irradiation; but that the adhesive films outside the scope of the present invention are evidently inferior in these respects.

EXAMPLES 6 to 10 and Comparative Examples 3 and 4

Aluminum was vacuum-deposited to a thickness of 10 mμ on the surface of each of the base films used in Examples 1 to 5 and Comparative Examples 1 and 2 (corresponding in this order to the base films used in Examples 6 to 10 and Comparative Examples 3 and 4), and an adhesive layer was applied to the aluminum-deposited surface in the same way as in Examples 1 to 5 and Comparative Examples 1 and 2.

The weatherability and the peel rate of the aluminum-deposited layer were measured with respect to the resulting adhesive films. The results are shown in Table 2.

The results shown in Table 2 demonstrate that the adhesive films of this invention are far superior to the adhesive films outside the scope of this invention in these respects.

Table 3-continued

|  | Transmittance of visible rays (%) | Transmittance of ultra-violet rays (%) | Temperature difference (° C.) |
|---|---|---|---|
| Comparative Example 5 | 91 | 68 | |

The results shown in Table 3 demonstrate that the thermic ray controlling adhesive film in accordance with the present invention shields visible light rays and exhibits a superior antidazzling effect, and that it prevents intense heat caused by sunlight and is effective for shutting off ultraviolet rays.

EXAMPLES 12 AND 13 AND COMPARATIVE EXAMPLE 6

Ester-interchange and polycondensation of dimethyl terephthalate and ethylene glycol were performed using as a catalyst 40 millimole% of manganese acetate, 20 millimole% of antimony trioxide and 40 millimole% of phosphorous acid (the amounts being based on the dimethyl terephthalate) to afford polyethylene terephthalate having an intrinsic viscosity of 0.65.

The polyethylene terephthalate was dried at 170° C, melt-extruded at 280° C, and quenched and solidified on a casting drum held at 40° C to afford an unstretched film having a thickness of 88 microns and an intrinsic viscosity of 0.62.

In Examples 12 and 13, the unstretched film was stretched in the machine direction at a stretch ratio of 3.5 and a temperature of 65° C while restraining it in the transverse direction, and heat-set for 30 seconds at each of the temperatures shown in Table 4 to afford a monoaxially oriented film having a thickness of 25 microns.

In Comparative Example 6, the unstretched film was stretched in the machine direction at a stretch ratio of 3.5 and a temperature of 90° C while restraining it in the transverse direction, and heat-set at 210° C for 30 seconds to afford a monoaxially oriented film having a thickness of 25 microns.

Using these films as bases, adhesive films were produced in the same way as in Examples 1 to 5 and Comparative Examples 1 and 2.

The properties of the films were tested, and the results are shown in Table 4.

Table 2

|  |  |  | Examples | | | | | Comparative Examples | |
|---|---|---|---|---|---|---|---|---|---|
|  |  |  | 6 | 7 | 8 | 9 | 10 | 3 | 4 |
| Heat-setting temperature (° C.) | | | 150 | 140 | 125 | 125 | 125 | 210 | 210 |
| Density (g/cm³) | | | 1.3814 | 1.3777 | 1.3716 | 1.3713 | 1.3714 | 1.3990 | 1.3988 |
| Irradiation by a high pressure mercury lamp | Before testing | Elongation at break (%) | 93 | 90 | 84 | 85 | 83 | 105 | 100 |
| | | Strength at break (kg/mm²) | 25.9 | 25.5 | 24.2 | 24.6 | 24.3 | 25.1 | 24.6 |
| | After exposure for 100 hours | Elongation of break (%) | 49 | 50 | 78 | 73 | 79 | 24 | 36 |
| mercury lamp | | Strength at break (kg/mm²) | 15.8 | 18.2 | 21.5 | 21.9 | 22.1 | 12.4 | 12.7 |
| | After exposure for 400 hours | Elongation at break (%) | 30 | 43 | 61 | 80 | 70 | 6 | 15 |
| | | Strength at break (kg/mm²) | 13.0 | 14.9 | 18.7 | 22.3 | 18.8 | 7.9 | 10.1 |
| Peel rate of the aluminum-deposited layer (%) | | | 15.4 | 8.6 | 3.3 | 2.5 | 2.7 | 43.3 | 45.1 |

EXAMPLE 11 and Comparative Example 5

In Example 11, the adhesive film for thermic ray control obtained in Example 8 (prepared by vacuum-depositing aluminum on one surface of the polyethylene terephthalate base film to a thickness of 10 mμ, and coating an adhesive on the aluminum-deposited layer) was bonded to a transparent glass sheet having a thickness of 6 mm. With respect to the resulting assembly, the transmittance of visible rays (550 nm) and ultraviolet rays (340 nm) were measured. Also, the assembly was used as a windowpane of a room and exposed to sunlight. The temperature inside the room was then measured.

In comparative Example, a transparent glass sheet having a thickness of 6 mm was used and the same measurements as above were performed.

The results are shown in Table 3. The temperature difference shown in Table 3 is the value obtained by subtracting the indoor temperature in Example 11 from the indoor temperature in Comparative Example 5.

Table 3

|  | Transmittance of visible rays (%) | Transmittance of ultra-violet rays (%) | Temperature difference (° C.) |
|---|---|---|---|
| Example 11 | 20 | 30 | 5 to 10 |

Table 4

|  |  | Example 12 | Example 13 | Comparative Example 6 |
|---|---|---|---|---|
| Heat-setting temperature (° C.) | | 150 | 125 | 210 |
| | $n_x$ | 1.686 | 1.664 | 1.701 |
| Refractive index | $n_z$ | 1.524 | 1.538 | 1.521 |
| Density (g/cm³) | | 1.3825 | 1.3751 | 1.3956 |
| Adhesion strength (g/inch) | | 1000 | 1200 | 700 |
| | Measuring direction | MD* | MD | MD |
| Irradiation by | Before Elongation at break (%) | 104 | 106 | 108 |

Table 4-continued

|  |  |  | Example 12 | Example 13 | Comparative Example 6 |
|---|---|---|---|---|---|
| a high pressure mercury lamp | testing | Strength at break (kg/mm²) | 25.1 | 24.1 | 23.9 |
|  | After exposure for 25 hrs. | Elongation at break (%) | 63 | 90 | 35 |
|  |  | Strength at break (kg/mm²) | 17.3 | 21.7 | 11.6 |
|  | After exposure for 50 hrs. | Elongation at break (%) | 46 | 87 | 5 |
|  |  | Strength at break (kg/mm²) | 14.9 | 21.1 | 9.3 |
|  | After exposure for 100 hrs. | Elongation at break (%) | 30 | 76 | 6 |
|  |  | Strength at break (kg/mm²) | 12.9 | 18.6 | 7.0 |

*Machine Direction

EXAMPLES 14 AND 15 AND COMPARATIVE EXAMPLE 7

Aluminum was vacuum-deposited on one surface of each of the biaxially oriented polyethylene terephthalate base films obtained in Examples 12 and 13 and Comparative Example 6, and then an adhesive was coated on the aluminum-deposited layer. The weatherability and the peel rate of the aluminum-deposited layer were measured with respect to the resulting adhesive films. The results are shown in Table 5. The base films used in Examples 14 and 15 and Comparative Example 7 corresponded respectively to those used in Examples 12 and 13 and Comparative Example 6.

heat-set for 10 seconds at each of the temperatures shown in Table 6 to afford a biaxially oriented film having a thickness of 36 microns (Examples 16 and 17).

For comparison, the above unstretched film was stretched in the machine direction at a stretch ratio of 3.2 and a temperature of 90° C and then in the transverse direction at a stretch ratio of 3.4 and a temperature of 110° C, and then heat-set for 10 seconds at 210° C to afford a biaxially oriented film having a thickness of 36 microns (Comparative Example 8).

For comparison, a commercially available biaxially oriented polyvinyl chloride film having a thickness of 36 microns were prepared (Comparative Example 9).

A solution of an adhesive prepared from 4.1 parts by

Table 5

|  |  |  | Example 14 | Example 15 | Comparative Example 7 |
|---|---|---|---|---|---|
| Heat setting temperature (° C.) |  |  | 150 | 125 | 210 |
| Density (g/cm³) |  |  | 1.3825 | 1.3751 | 1.3956 |
| Irradiation by a high pressure mercury lamp | Before testing | Elongation at break (%) | 104 | 106 | 109 |
|  |  | Strength at break (kg/mm²) | 25.4 | 24.3 | 24.1 |
|  | After exposure for 100 hrs. | Elongation at break (%) | 61 | 88 | 35 |
|  |  | Strength at break (kg/mm²) | 17.4 | 21.9 | 11.4 |
|  | After exposure for 400 hrs. | Elongation at break (%) | 33 | 75 | 5 |
|  |  | Strength at break (kg/mm²) | 13.0 | 18.0 | 7.4 |
| Peel rate of the aluminum-deposited layer (%) |  |  | 15.6 | 2.4 | 43.5 |

EXAMPLES 16 AND 17 AND COMPARATIVE EXAMPLES 8 AND 9

Chips of polyethylene terephthalate having an intrinsic viscosity of 0.65 were dried, and melt-extruded in a customary manner to afford an unstretched film having a thickbess of 390 microns.

The unstretched film was stretched in the machine direction at a stretch ratio of 3.2 and a temperature of 65° C, and successively in the transverse direction at a stretch ratio of 3.4 and a temperature of 65° C, and then weight of a natural rubber/methyl methacrylate/acrylonitrile graft polymer, 0.8 part by weight of a terpene resin, 0.10 part by weight of zinc oxide (zinc flower), 0.06 part by weight of 2,2'-dihydroxy-4-methoxy- benzophenone and 6.0 parts by weight of toluene was coated on each of the above base films by means of a roll coater, and then dried at 90° C to form an adhesive layer having a thickness of 10 microns.

The properties of the resulting adhesive films were measured, and the results are shown in Table 6.

Table 6

|  |  |  | Example 16 | | Example 17 | | Comparative Example 8 | | Comparative Example 9 | |
|---|---|---|---|---|---|---|---|---|---|---|
| Heat-setting temperature (° C.) | | | 150 | | 125 | | 210 | | Hard polyvinyl chloride film | |
| Density (g/cm³) | | | 1.3821 | | 1.3736 | | 1.3991 | | | |
| Haze | | | 0.49 | | 0.51 | | 0.49 | | 1.90 | |
| Stretching direction | | | MD*¹ | TD*² | MD | TD | MD | TD | MD | TD |
| Heat shrinkage (%) | | | 4.10 | 6.51 | 12.3 | 24.9 | 1.00 | 1.53 | 33.5 | 24.6 |
| Irradiation by a high pressure mercury lamp | Before testing | Elongation (%) | 121 | 143 | 123 | 126 | 133 | 143 | 115 | 125 |
|  |  | Strength at break (kg/mm²) | 24.7 | 20.0 | 23.9 | 22.1 | 23.5 | 18.8 | 11.1 | 7.40 |
|  | After exposure for 25 hrs. | Elongation at break (%) | 62 | 78 | 79 | 83 | 35 | 41 | 36 | 40 |
|  |  | Strength at break (kg/mm²) | 16.5 | 14.7 | 18.9 | 18.4 | 12.4 | 11.0 | 6.9 | 6.2 |
|  | After exposure for 50 hrs. | Elongation at break (%) | 47 | 55 | 83 | 81 | 5 | 6 | 7 | 6 |
|  |  | Strength at break (kg/mm²) | 13.1 | 11.8 | 18.9 | 18.1 | 9.6 | 8.6 | 7.3 | 6.5 |
|  | After exposure for 100 hrs. | Elongation at break (%) | 32 | 34 | 75 | 80 | 4 | 3 | — | — |
|  |  | Strength at break (kg/mm²) | 12.0 | 11.9 | 17.1 | 16.8 | 7.6 | 6.1 | — | — |
| Light | Before exposure | | 93.5 | | 93.1 | | 93.2 | | 93.4 | |
|  | After exposure for 500 hours | | 90.3 | | 90.2 | | 90.0 | | 89.0 | |

Table 6-continued

|  |  | Example 16 | Example 17 | Comparative Example 8 | Comparative Example 9 |
|---|---|---|---|---|---|
| transmittance (%) | After exposure for 1000 hours | 86.5 | 86.7 | 81.6 | 63.0 |
|  | After exposure for 1500 hours | 83.0 | 85.1 | 75.6 | —[3] |

[1] Machine direction
[2] Transverse direction
[3] Not measurable because the film became crumbled The results shown in Table 6 demonstrate that the adhesive films of this invention having films with a density of less than 1.390 g/cm$^3$ as a base have better weatherability than the adhesive film having a film with a density of more than 1.390 g/cm$^3$, and have better transparency and weatherability than the adhesive tape having the hard polyvinyl chloride film as a base.

Tapes with a width of 18 mm were prepared from the adhesive tapes produced in Examples 16 and 17 and Comparative Example 8, and each wrapped loosely around electric wires outdoors. According to this heat shrinkage service test, the tapes of Examples 16 and 17 shrank upon exposure to sunlight for one day, and coiled tightly to the wire. In contrast, the tape of Comparative Example 8 did not become taut, but the loosening remained.

EXAMPLES 18 to 20

Ester-interchange and polycondensation of dimethyl terephthalate and ethylene glycol were performed using as a catalyst 40 millimole% of manganese acetate, 20 millimole% of antimony trioxide and 40 millimole% of phosphorous acid to afford polyethylene terephthalate having an intrinsic viscosity of 0.63 (Example 18), 0.69 (Example 19), and 0.75 (Example 20).

The polyethylene terephthalate was dried at 170° C, melt-extruded at 280° C, and quenched and solidified on a casing drum held at 40° C to afford an unstretched film having a thickness of 1,100 microns, and an intrinsic viscosity of 0.60 (Example 18), 0.65 (Example 19), and 0.71 (Example 20).

The unstretched film was stretched in the machine direction at a stretch ratio of 3.2 and a temperature of 60° C, and successively in the transverse direction at a stretch ratio of 3.5 and a temperature of 60° C, and then heat-set for 10 seconds at each of the temperatures shown in Table 7 to afford a biaxially oriented film having a thickness of 100 microns.

A solution of an adhesive was coated on each of the resulting films as a base by means of a roll coater, and dried at 140° C for 10 minutes to form an adhesive layer having a thickness of 20 microns. The adhesive solution used was a mixture of a polymer solution obtained by copolymerizing 128 parts by weight of butyl acrylate and 17 parts by weight of diketene in 417 parts by weight of ethyl acetate as a solvent in the presence of a ZnCl$_2$ catalyst, with 10 parts by weight, per 100 parts by weight of the solids content of the polymer solution, of a phenolic resin.

The properties of the resulting adhesive films were measured, and the results are shown in Table 7.

The results shown in Table 7 demonstrate that the occurrence of breakage in the base film of the adhesive film of this invention during its production is reduced, and the adhesive film has a very superior adhesion strength of 1,100 to 1,300 g/inch, and that even after exposed for 100 hours to a high-pressure mercury lamp, the adhesive film retains more than 50% of its initial strength before irradiation.

Table 7

|  |  |  | Example 18 | | Example 19 | | Example 20 | |
|---|---|---|---|---|---|---|---|---|
| Intrinsic viscosity of the film | | | 0.60 | | 0.65 | | 0.71 | |
| Frequency of breakage during stretch (times/500,000 meters) | | | 1 – 2 | | 0 – 1 | | 0 – 1 | |
| Heat-setting temperature (° C.) | | | 150 | 125 | 150 | 125 | 150 | 125 |
| Refractive index | | $n_x$ | 1.6137 | 1.6056 | 1.6116 | 1.6003 | 1.6066 | 1.5956 |
|  |  | $n_y$ | 1.6764 | 1.6753 | 1.6711 | 1.6703 | 1.6681 | 1.6661 |
|  |  | $n_z$ | 1.5175 | 1.5183 | 1.5213 | 1.5245 | 1.5046 | 1.5274 |
| Density (g/cm$^3$) | | | 1.3835 | 1.3754 | 1.3819 | 1.3737 | 1.3803 | 1.3722 |
| Haze (%) | | | 0.81 | 0.83 | 0.61 | 0.59 | 0.34 | 0.30 |
| Adhesion strength (g/inch) | | | 1100 | 1250 | 1150 | 1280 | 1180 | 1300 |
|  |  | Measuring direction | MD | MD | MD | MD | MD | MD |
| Irradiation by a high pressure mercury lamp | Before testing | Elongation at break (%) | 127 | 120 | 130 | 120 | 121 | 113 |
|  |  | Strength at break (kg/mm$^2$) | 24.5 | 23.5 | 25.1 | 24.3 | 29.7 | 30.0 |
|  |  | Tear strength (kg/mm) | 1.75 | 1.70 | 1.80 | 1.83 | 1.93 | 1.91 |
|  | After exposure for 25 hrs. | Elongation at break (%) | 64 | 80 | 68 | 91 | 73 | 91 |
|  |  | Strength at break (kg/mm$^2$) | 16.1 | 19.1 | 17.1 | 19.6 | 21.1 | 25.8 |
|  | After exposure for 50 hrs. | Elongation at break (%) | 47 | 80 | 53 | 88 | 55 | 92 |
|  |  | Strength at break (kg/mm$^2$) | 14.3 | 19.3 | 15.0 | 19.7 | 18.9 | 23.8 |
|  | After exposure for 100 hrs. | Elongation at break (%) | 36 | 75 | 36 | 79 | 40 | 83 |
|  |  | Strength at break (kg/mm$^2$) | 13.0 | 16.9 | 14.3 | 18.9 | 18.3 | 20.9 |
|  |  | Tear strength (kg/mm) | 0.95 | 1.00 | 1.21 | 1.33 | 1.40 | 1.46 |

EXAMPLES 21 AND 22 AND COMPARATIVE EXAMPLE 10

In the same way as in Examples 18 to 20, polyethylene terephthalate chips having an intrinsic viscosity of 0.60 (Examples 21 and 22) and 0.69 (Comparative Example 10) were prepared, and melt-extruded in the same way as in Examples 18 to 20 to afford unstretched films having a thickness of 1,100 microns and an intrinsic viscosity of 0.52 (Examples 21 and 22) and 0.65 (Comparative Example 10).

Each of the unstretched films was stretched in the machine direction at a stretch ratio of 3.2 and a temperature of 90° C and successively in the transverse direction at a stretch ratio of 3.5 and a temperature of 110° C, and then heat-set for 10 seconds at each of the temperatures shown in Table 8 to afford biaxially oriented films having a thickness of 100 microns.

Adhesive films were prepared in the same way as in Examples 18 and 20 using these films as bases. The properties of the resulting adhesive films were measured, and the results are shown in Table 8.

The results shown in Table 8 demonstrate that the adhesive film having a base film with a density larger than that specified in the present invention has inferior weatherability.

each of the temperatures shown in Table 9 to afford a biaxially oriented film having a thickness of 36 microns.

In Comparative Examples 11 and 12, an unstretched film having a thickness of 504 microns obtained in the same way as in Examples 23 to 29 was stretched in the machine direction at a stretch ratio of 3.5 and a temperature of 90° C and successively in the transverse direction at a stretch ratio of 4.0 and a temperature of 110° C Table 8

|  |  |  | Example 21 | Example 22 | Comparative Example 10 |
|---|---|---|---|---|---|
| Intrinsic viscosity of the film |  |  | 0.52 | 0.52 | 0.65 |
| Frequency of breakage during stretch (times/500,000 meters) |  |  | 8 – 10 | 8 – 10 | 0 – 1 |
| Heat-setting temperature (° C.) |  |  | 150 | 125 | 210 |
| Refractive index | | $n_x$ | 1.6167 | 1.6096 | 1.6193 |
| | | $n_y$ | 1.6791 | 1.6776 | 1.6817 |
| | | $n_z$ | 1.5154 | 1.5167 | 1.5182 |
| Density (g/cm$^3$) |  |  | 1.3842 | 1.3771 | 1.3996 |
| Haze (%) |  |  | 2.26 | 2.31 | 0.98 |
| Adhesion strength (g/inch) |  |  | 1050 | 1200 | 700 |
| | | Measuring direction | MD | MD | MD |
| Irradiation by a high pressure mercury lamp | Before testing | Elongation break (%) | 136 | 130 | 140 |
| | | Strength at break (kg/mm$^2$) | 22.2 | 22.2 | 24.6 |
| | | Tear strength (kg/mm) | 0.50 | 0.48 | 1.33 |
| | After exposure for 25 hrs. | Elongation at break (%) | 53 | 60 | 30 |
| | | Strength at break (kg/mm$^2$) | 13.0 | 14.9 | 12.7 |
| | After exposure for 50 hrs. | Elongation at break (%) | 33 | 55 | 4 |
| | | Strength at break (kg/mm$^2$) | 11.9 | 14.9 | 8.6 |
| | After exposure for 100 hrs. | Elongation at break (%) | 16 | 35 | 5 |
| | | Strength at break (kg/mm$^2$) | 11.6 | 12.5 | 7.0 |
| | | Tear strength (kg/mm) | 0.26 | 0.26 | 0.59 |

EXAMPLES 23 TO 29 AND COMPARATIVE EXAMPLES 11 AND 12

Ester-interchange and polycondensation of dimethyl terephthalate and ethylene glycol were performed using as a catalyst 40 millimole% of manganese acetate, 20 millimole% of antimony trioxide and 40 millimole% of phosphorous acid to afford polyethylene terephthalate having an intrinsic viscosity of 0.65.

The resulting polyethylene terephthalate was dried at 170° C, and dry-blended with each of the ultraviolet absorbents shown in Table 9 in each of the amounts indicated in the same table. The blend was melt-extruded at 280° C, and quenched and solidified on a casting drum held at 40° C to afford an unstretched film having a thickness of 5.04 microns.

In Examples 23 to 29, the unstretched film was stretched in the machine direction at a stretch ratio of 3.5 and a temperature of 65° C, and successively in the transverse direction at a stretch ratio of 4.0 and a temperature of 65° C, and then heat-set for 10 seconds at to afford a biaxially oriented film having a thickness of 36 microns.

A solution of an adhesive having the following formulation was coated on each of these films as a base by means of a knife coater, and dried in the air to form an adhesive layer having a thickness of 15 microns.

| Adhesive solution | Parts by weight |
|---|---|
| An unsaturated polyester derived from phthalic acid/fumaric acid/ propylene glycol in a mole ratio of 1:1.3:2 | 15 |
| A 30% by weight solution of polymethyl methacrylate in a mixed solvent of toluene/butanol in a volume ratio of 90/10 | 17 |
| Diallyl phthalate | 5 |
| Benzoyl butyl ether | 4 |
| Toluene | 34 |

The properties of the resulting adhesive films were measured, and the results are shown in Table 9.

Table 9

| | Ultraviolet absorber | | Heat-setting temp. (° C.) | Properties of the film | | | | | | |
|---|---|---|---|---|---|---|---|---|---|---|
| | | | | Density (g/cm$^3$) | A/d (cm$^{-1}$) | Strength and elongation | | | Exposure time* (hr.) | Adhesive strength (g/inch) |
| | Type | Amount (wt. %) | | | | Stretching direction | Elongation at break (%) | Strength at break (kg/mm$^2$) | | |
| Example 23 | 2,2',4,4'-tetrahydroxy-benzophenone | 1.0 | 150 | 1.3815 | 500 | MD | 95 | 24.5 | 4100 | 1100 |
| Example 24 | " | 1.0 | 125 | 1.3750 | 500 | MD | 85 | 24.3 | 4500 | 1150 |
| Example 25 | " | 0.5 | 125 | 1.3745 | 250 | MD | 83 | 24.4 | 4000 | 1200 |
| Example 26 | " | 0.1 | 125 | 1.3744 | 50 | MD | 81 | 24.6 | 3700 | 1200 |
| Example 27 | " | 0.05 | 125 | 1.3746 | 25 | MD | 83 | 24.1 | 3400 | 1250 |
| Example 28 | 2,4-dihydroxy-benzophenone | 1.0 | 125 | 1.3749 | 700 | MD | 85 | 24.2 | 4200 | 1150 |
| Example 29 | none | 0 | 125 | 1.3760 | 20 | MD | 82 | 24.3 | 2000 | 1200 |
| Comparative Example 11 | none | 0 | 210 | 1.3988 | 20 | MD | 80 | 23.9 | 700 | 700 |
| Com- | 2,2',4,4'- | | | | | | | | | |

Table 9-continued

| | Ultraviolet absorber | | Heat-setting temp. (°C.) | Properties of the film | | | | | | |
|---|---|---|---|---|---|---|---|---|---|---|
| | | | | Density (g/cm³) | A/d (cm⁻¹) | Strength and elongation | | | Exposure time* (hr.) | Adhesive strength (g/inch) |
| | Type | Amount (wt. %) | | | | Stretching direction | Elongation at break (%) | Strength at break (kg/mm²) | | |
| parative Example 12 | tetrahydroxy-benzophenone | 0.05 | 210 | 1.3989 | 500 | MD | 81 | 24.1 | 1000 | 750 |

*The time of exposure by a sunshine weather-ometer required until the residual strength of the base film in the machine direction becomes 50%.

The following conclusion can be drawn from the data given in Table 9.

In the case of an ordinary polyethylene terephthalate base film having a density larger than 1.390 and not containing an ultraviolet absorber (Comparative Example 11), the time of exposure by a sunshine weather-ometer which is required until the residual strength of the film in the machine direction is decreased to 50% is 700 hours. In contrast, in the case of an ordinary polyethylene terephthalate base film having a density larger than 1.390 and containing 0.05% of 2,2',4,4'-tetrahydroxy-benzophenone as an ultraviolet absorber (Comparative Example 12), the exposure time is 1,000 hours. Accordingly, in adhesive films having ordinary polyethylene terephthalate films having a density larger than 1.390 as a base, the prolongation of the exposure time by 300 hours can be recognized as an effect of adding an ultraviolet absorber.

Furthermore, in the case of the polyethylene terephthalate base film in accordance with this invention which has a density smaller than 1.390 and an A/d value of 20 (Comparative Example 29), the exposure time is 2,000 hours. In contrast, in the case of the polyethylene terephthalate base film in accordance with this invention which contains 0.05% of 2,2',4,4'-tetrahydroxybenzophenone as an ultraviolet absorber and has an A/d value of 25 and a density of 1.3746 (Example 27), the exposure time is 3,400 hours. Accordingly, in adhesive films having polyethylene terephthalate films in accordance with this invention which have a density smaller than 1.390 as a base, the prolongation of the exposure time by 1,400 hours can be recognized as an effect of adding an ultraviolet absorber.

It can be seen from the above results that when an ultraviolet absorber is added to the polyethylene terephthalate adhesive film of this invention to adjust its A/d value to at least 25, a remarkable synergistic effect can be brought in regard to its weatherability.

The results shown in Table 9 demonstrate that the adhesive films of this invention have very superior adhesion strength.

EXAMPLES 30 TO 36 AND COMPARATIVE EXAMPLES 13 AND 14

Aluminum was vacuum-deposited to a thickness of 15 mμ on one surface of each of the base films used in Examples 23 to 29 and Comparative Examples 11 and 12, and the same adhesive layer having a thickness of 15 microns as in Examples 23 to 29 and Comparative Examples 11 and 12 was formed on the opposite surface not having the aluminum-deposited layer. The base films used in Examples 23 and 29 and Comparative Examples 13 and 14 corresponded in this order to those used in Examples 30 to 36 and Comparative Examples 13 and 14.

The peel rate of the aluminum-deposited layer was measured with respect to the resulting adhesive films. It was confirmed that the peel rates of the adhesive films in accordance with this invention are low. The results are shown in Table 10.

Table 10

| | Examples | | | | | | | Comparative Examples | |
|---|---|---|---|---|---|---|---|---|---|
| | 30 | 31 | 32 | 33 | 34 | | 36 | 13 | 14 |
| Heat-setting temperature (°C.) | 150 | 125 | 125 | 125 | 125 | 125 | 125 | 210 | 210 |
| Density (g/cm³) | 1.3815 | 1.3750 | 1.3745 | 1.3744 | 1.3746 | 1.3749 | 1.3760 | 1.3988 | 1.3989 |
| Peel rate of the aluminum-deposited layer (%) | 17.3 | 3.7 | 5.1 | 6.5 | 2.4 | 4.0 | 4.5 | 43.9 | 46.5 |

EXAMPLE 37 AND COMPARATIVE EXAMPLE 15

In Example 37, aluminum was vacuum-deposited to a thickness of 15 mμ on one surface of the base film used in Example 28, and the same adhesive solution was used in Example 23 to 29 and Comparative Examples 11 to 12 was coated on the aluminum-deposited layer followed by drying in the air to form a thermic ray controlling adhesive film having an adhesive layer with a thickness of 15 microns. The adhesive film was bonded to a transparent glass sheet having a thickness of 6 mm using water as a lubricating agent. In about 3 weeks, the adhesive cured, and sufficient adhesion was attained.

With respect to this assembly, the transmittance of visible rays (550 nm) and the transmittance of ultraviolet rays (340nm) were measured. Also, the indoor temperature was measured when the assembly was used as a windowpane and exposed to sunlight.

In Comparative Example 15, the same measurements were made with respect to a transparent glass sheet having a thickness of 6 mm.

The results are shown in Table 11. The temperature difference shown in this table is a value obtained by subtracting the indoor temperature in Example 37 from the indoor temperature in Comparative Example 15.

Table 11

| | Transmittance of visible rays (%) | Transmittance of ultraviolet rays (%) | Temperature difference (°C.) |
|---|---|---|---|
| Example | 10 | 16 | |
| Comparative Example 15 | 91 | 68 | 10 to 15 |

The results shown in Table 11 demonstrate that the adhesive film in accordance with this invention for thermic ray control shields visible light rays and exhibits superior antidazzling efect, and that it prevents intense heat caused by sunlight and is also effective for shutting off ultraviolet rays.

What we claim is:

1. An adhesive film having weatherability comprising (I) a polyethylene terephthalate film base being oriented in at least one direction and having a refractive index, in the orientation direction, of 1.59 to 1.75, a refractive index, in the thickness direction, of 1.485 to 1.56, a density of 1.350 to 1,382 g/cm$^3$ and a thickness of 5 to 250 microns, (III) a layer of a metallic film applied directly to at least one surface of the film base and (II) an adhesive layer coated directly on the exposed surface of at least one of the metallic film layers.

2. The adhesive film of claim 1 wherein said metallic film has a thickness of 5 to 200 m$\mu$.

3. The adhesive film of claim 2 wherein said polyethylene terephthalate film base is further characterized by the fact that when it is exposed for 1 minute to hot air at 120° C in the relaxed state, it shows a shrinkage of at least 4% in at least one direction.

4. The adhesive film of claim 2, wherein said polyethylene terephthalate film base is further characterized by the fact that it has an intrinsic viscosity of 0.60 to 0.95.

5. The adhesive film of claim 2 wherein said polyethylene terephthalate film base is further characterized by the fact that in an ultraviolet wavelength region of not more than 325 nm, it satisfies the following equation $$A/d \geq 25$$

wherein $A$ is the optical density of the base film measured by a spectrophotometer, and $d$ is the thickness of the base film in centimeters.

6. The adhesive film, of claim 2 wherein said polyethylene terephthalate film base in further characterized by the fact that it has a crystal size in the direction of 010 plane of 15 to 45A, a crystal size in the direction of 100 plane of 20 to 55A, and a long period of 100 to 140 A.

7. An adhesive film having weatherability comprising (I) a polyethylene terephthalate film base being oriented in at least one direction and having a refractive index, in the orientation direction, of 1.59 to 1.75, a refractive index, in the thickness direction, of 1.485 to 1.56, a density of 1.350 to 1.382 g/cm$^3$ and a thickness of 5 to 250 microns, (II) an adhesive layer coated directly on one surface of said film base, and (III) a metallic film layer applied directly to the other surface of the film base.

8. The adhesive film of claim 7 wherein said metallic film has a thickness of 5 to 200 m$\mu$.

* * * * *